(12) United States Patent
Wilson

(10) Patent No.: US 11,468,482 B2
(45) Date of Patent: Oct. 11, 2022

(54) SYSTEMS AND METHODS FOR IDENTITY-PROTECTED DATA ELEMENT DISTRIBUTION NETWORK

(71) Applicant: Yahoo Ad Tech LLC, Dulles, VA (US)

(72) Inventor: Jeffrey Todd Wilson, Ashburn, VA (US)

(73) Assignee: Yahoo Ad Tech LLC, Dulles, VA (US)

( * ) Notice: Subject to any disclaimer, the term of this patent is extended or adjusted under 35 U.S.C. 154(b) by 299 days.

(21) Appl. No.: 16/031,766

(22) Filed: Jul. 10, 2018

(65) Prior Publication Data

US 2018/0322541 A1 Nov. 8, 2018

Related U.S. Application Data

(63) Continuation of application No. 14/282,074, filed on May 20, 2014, now Pat. No. 10,049,392.

(51) Int. Cl.
*G06Q 30/02* (2012.01)
*G06Q 30/00* (2012.01)
*G06F 21/62* (2013.01)

(52) U.S. Cl.
CPC ..... *G06Q 30/0277* (2013.01); *G06F 21/6263* (2013.01); *G06Q 30/00* (2013.01)

(58) Field of Classification Search
None
See application file for complete search history.

(56) References Cited

U.S. PATENT DOCUMENTS

| 6,049,821 A * | 4/2000 | Theriault .......... H04L 63/0236 709/203 |
| 6,993,572 B2 | 1/2006 | Rose, Jr. |
| 7,523,191 B1 * | 4/2009 | Thomas .............. G06F 11/3476 709/224 |
| 8,185,608 B1 | 5/2012 | York |
| 8,850,219 B2 * | 9/2014 | Dapkus ................ H04L 9/3234 713/185 |
| 2002/0169793 A1 | 11/2002 | Sweeney |
| 2003/0080997 A1 | 5/2003 | Fuehren |
| 2007/0136417 A1 | 6/2007 | Kreiner |
| 2007/0157304 A1 | 7/2007 | Logan et al. |
| 2008/0195665 A1 | 8/2008 | Mason |
| 2008/0235243 A1 | 9/2008 | Lee et al. |

(Continued)

OTHER PUBLICATIONS

Search Report issued in PCT/US2015/031613 dated Sep. 14, 2015 (2 pages).

*Primary Examiner* — Chrystina E Zelaskiewicz
(74) *Attorney, Agent, or Firm* — Bookoff McAndrews, PLLC

(57) ABSTRACT

Systems and methods are disclosed for protecting consumer privacy in an online advertising environment. A request may be received from a browser for a webpage along with a unique browser identifier. The browser may be provided a first portion of the webpage that is locally available. The unique browser identifier may be provided to at least one advertising entity, wherein the advertising entity determines an advertisement based, at least in part, on the unique browser identifier. The advertisement may be received from the advertising entity, and provided to the browser as a second portion of the webpage.

17 Claims, 7 Drawing Sheets

(56) References Cited

U.S. PATENT DOCUMENTS

| | | | |
|---|---|---|---|
| 2009/0187486 A1* | 7/2009 | Lefenfeld | G06Q 30/02 |
| | | | 705/14.73 |
| 2009/0216642 A1 | 8/2009 | Ho et al. | |
| 2010/0076994 A1 | 3/2010 | Soroca | |
| 2011/0055189 A1 | 3/2011 | Effrat | |
| 2012/0109734 A1 | 5/2012 | Fordyce, III et al. | |
| 2012/0150641 A1 | 6/2012 | Dobbs et al. | |
| 2012/0284746 A1 | 11/2012 | Evans et al. | |
| 2013/0124339 A1* | 5/2013 | Park | G06Q 30/0251 |
| | | | 705/14.71 |
| 2013/0179985 A1 | 7/2013 | Strassmann | |
| 2014/0188766 A1* | 7/2014 | Waldman | G06F 16/904 |
| | | | 707/723 |
| 2015/0088635 A1* | 3/2015 | Maycotte | G06Q 30/0244 |
| | | | 705/14.43 |

* cited by examiner

SYSTEMS AND METHODS FOR IDENTITY-PROTECTED DATA ELEMENT DISTRIBUTION NETWORK

CROSS-REFERENCE TO RELATED APPLICATION(S)

This patent application claims the benefit of priority to and is a continuation of U.S. Nonprovisional patent application Ser. No. 14/282,074, filed on May 20, 2014, the entirety of which is incorporated herein by reference.

TECHNICAL FIELD

The present disclosure relates generally to electronic and online user privacy techniques and related systems and methods. More particularly, and without limitation, the present disclosure relates to systems and methods for protecting user privacy in, for example, online advertising environments.

BACKGROUND

Due to the vast and increasing amount of traffic generated by users on the Internet, businesses continue to seek more effective means to advertise their goods and services online. In recent years, the online advertising environment has evolved to generally include five primary participants: "advertisers," "first party publishers," "ad servers," "audience intelligence providers," and "ad exchanges."

An "advertiser" is generally a merchant of goods and/or services willing to pay to have its ads presented to users online. A "first party publisher," or simply "publisher," generally refers to the owner and operator of one or more content websites having advertising space (e.g., "banners") available for "lease" by advertisers. An "ad server" maintains an inventory of ads (e.g., on one or more servers) associated with various advertisers, and delivers the ads to publishers' websites on a user browser in response to a trigger, such as a request from a publisher webpage being loaded with a user browser. An "ad exchange," or similarly an "ad network," essentially acts as an ad broker, matching the publishers' available advertising space with ads based on a variety of criteria, such as user information, bidding information, budget information, ad campaign information, or other criteria. An "audience intelligence provider," or "data provider," generally refers to a party that gathers information about users, such as demographic information, preferences, interests, etc., for use by the ad exchanges and/or ad networks in the process of selecting and serving a particular ad to a particular user. For example, websites affiliated with the ad networks and/or ad exchanges may gather information about users as they interact with the websites, and provide the gathered information to the ad networks and/or ad exchanges for use in the ad selection process. In addition, data providers may even gather information about users in offline environments, such as from paper transactions (e.g., a mortgage application), and provide the user information to ad exchanges and/or ad networks for use in online advertising.

Generally speaking, advertisers are willing to pay for three types user interactions with an ad: an "impression," a "click," and a "conversion." An "impression" refers to an instance of an ad being selected and served to a user on the website of a publisher. A "click" refers to an instance of a user actually clicking on or otherwise selecting an advertisement. A "conversion" refers to an instance of the user following through on the ad, such as by making a purchase, enrolling in a program, providing certain information, etc. Advertisers are generally willing to pay more per conversion than per click, and more per click than per impression.

In an effort to spend their online advertising budgets on those users who will most likely be interested in their ads, advertisers develop "ad campaigns" or marketing plans that identify certain types of users as targets for given products or services. In other cases, advertisers may be unsure of what types of users are most likely to respond to a given product and/or ad, and may wish to gather specific information about the users viewing various types of websites and responding to their ads. The advertisers may then develop a targeted ad campaign or marketing strategy (e.g., for a particular good and/or service) based on the gathered information. For example, an ad campaign relating to a new video game may target males ages 13-21 browsing certain game-related websites during a period surrounding the release of the game. The ad campaign may further specify budgeting information, such as prices the advertiser is willing to pay per impression, click, and conversion.

When a user visits the webpage of a publisher, the instance of the publisher webpage executing in the user's browser generates a request for ads to fill any available ad space on the page. The ad networks and/or ad exchanges facilitate "bids" on the available ad space, based on information contained in the request, such as pricing information, ad type information, a unique identifier associated with the user, etc., and on ad campaign information. If the bid of a particular advertiser is accepted, the ad network and/or ad exchange select and serve a targeted ad associated with the winning advertiser for display on the user's browser.

Implementing targeted ad campaigns requires the audience intelligence providers to gather and process information about users, which is known as "profiling." One way intelligence providers gather user information is by tracking users as they surf the Internet using "cookies." Generally, a cookie is a small piece of data placed on the user's browser when the user visits a website belonging to an ad network. The cookie usually contains, among other things, a unique identifier associated with the user. Depending on the practices of the ad network, the cookie may contain other information, such as date and time information, an estimated zip code of the user, and browser history information. The cookie is stored for a specified time and returned whenever the user subsequently visits that website or another website in the ad network. By compiling and analyzing cookie information associated with a particular user gathered across multiple websites, a "user profile" indicating various attributes, preferences, and/or interests of the user can be built. This profile may then be used by ad networks and/or ad exchanges to support targeted ad campaigns. Of course, other user tracking methods may be used by intelligence providers to gather information about users and build user profiles.

Recent improvements in data correlation techniques have allowed third parties such as data brokers and other audience intelligence providers to link multiple user profiles together, and even discover real-world user identity information. As a result, sensitive information about an individual may be discovered and misused. Many users are unaware that personal data is being collected off of their device and sold to third parties. Some people find such user tracking and profiling methods employed by online advertisers to be intrusive or invasive, but find opting out to be difficult.

Embodiments of the current disclosure may alleviate the problems discussed above and/or other problems in the art.

The scope of the current disclosure, however, is defined by the attached claims, and not by the ability to solve any specific problem.

SUMMARY

Embodiments of the present disclosure relate to, among other things, systems and methods for protecting the identity of a user in online advertising. Each of the embodiments disclosed herein may include one or more of the features described in connection with any of the other disclosed embodiments.

In one embodiment, a computer-implemented method is provided for protecting consumer privacy in an online advertising environment, the method comprising: receiving a request, from a browser, for a webpage along with a unique browser identifier; providing, to the browser, a first portion of the webpage that is locally available; providing the unique browser identifier to at least one advertising entity, wherein the advertising entity determines an advertisement based, at least in part, on the unique browser identifier; receiving the advertisement from the advertising entity; and providing the advertisement to the browser as a second portion of the webpage.

In another embodiment, a computer-implemented method for protecting consumer privacy in an online advertising environment is provided, the method comprising: sending a request, to a publisher, for a webpage along with a unique browser identifier and non-linked user data; receiving, from the publisher, a first portion of the webpage; and receiving, as a second portion of the webpage, an advertisement from the publisher, wherein the advertisement was determined based, at least in part, on the unique browser identifier and non-linked user data.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

The present disclosure describes systems and methods for protecting the identity of a user in online advertising. While principles of the current disclosure are described with reference to online advertising, it should be understood that the disclosure is not limited thereto. Rather, the systems and methods of the present disclosure may be used in any networked system to provide identity protection.

Figure 1:
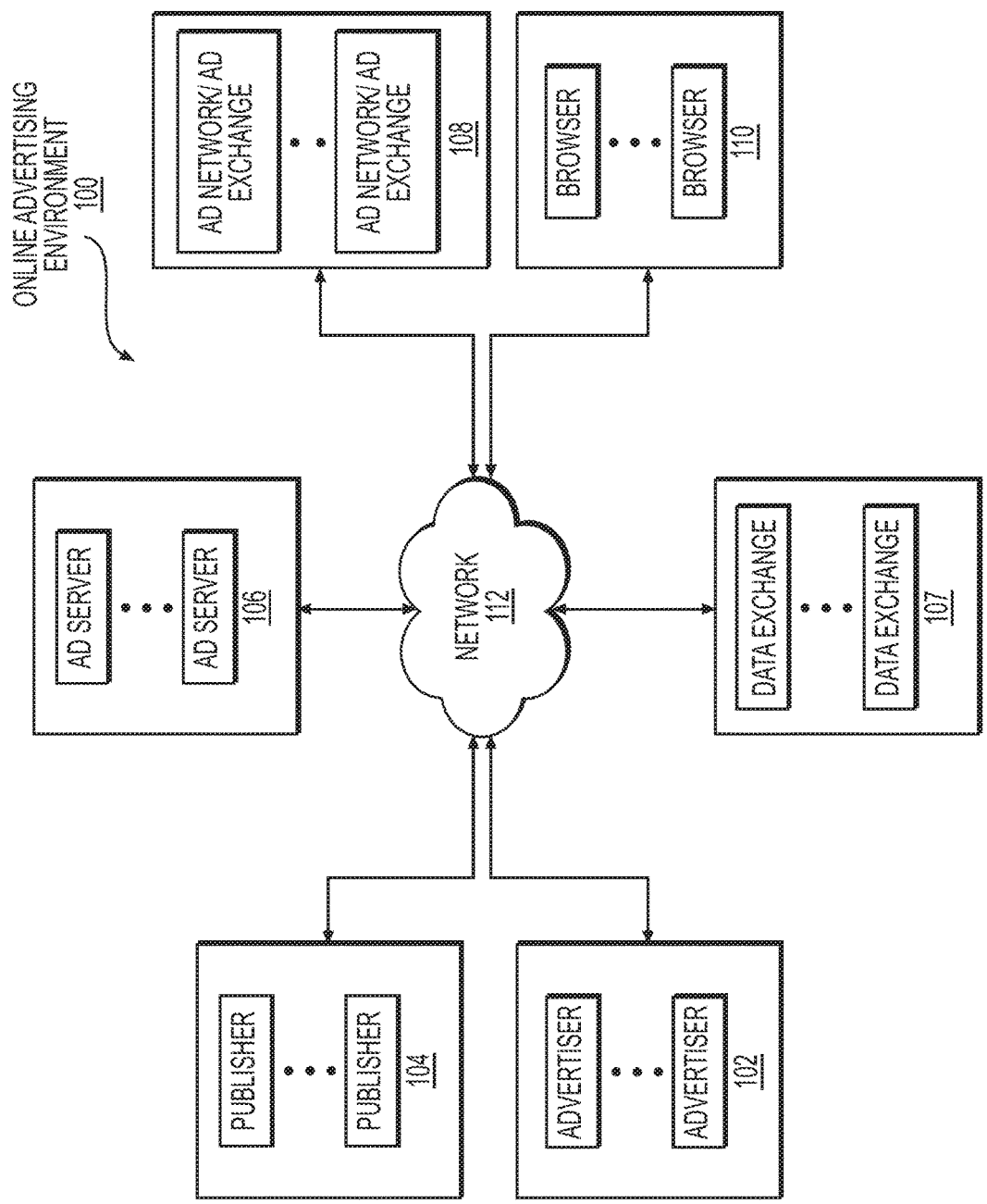
FIG. 1 shows a block diagram of an exemplary online advertising environment for providing consumer privacy.

FIG. 1 illustrates an exemplary online advertising environment 100 in which consumer privacy may be provided, such as by protecting consumer identity, consistent with the disclosed embodiments. As shown, environment 100 may include third-party advertisers ("advertisers") 102, first-party publishers ("publishers") 104, ad servers 106, data exchanges 107, ad networks and/or ad exchanges 108, and user browsers 110, in communication via a network 112, such as the Internet. As a preliminary matter, it should be appreciated that the term, "browser," wherever used in the specification, drawings, and claims of this application, may include any web-enabled application or web-enabled browser of a computer, mobile phone, smartphone, set-top box, television, etc., and may not necessarily be limited to a browser in the traditional sense. Moreover, any browser/device disclosed herein, although depicted as connected via the Internet, may be thought of as being "disconnected" from the third party networks, such that external entities are deterred from communicating directly with the browser/device except through the publisher "proxy" modules/systems, etc. In other words, as described in more detail below, in most cases, therefore, the third party entities may be limited to receiving an ID associated with users, unless the user offers additional information, a publisher provides user consent, and/or a publisher chooses to provide some form of documentation of ad delivery/anti-fraud information.

Advertisers 102 may include one or more computing devices associated with any business entities having online advertisements, such as banner ads, pop-ups, etc. desired to be delivered to online users. Advertisers 102 may interact with publishers 104, ad servers 106, ad networks/exchanges 108, and/or data exchanges 107 via network 112 to communicate, among other things, ad information, targeting information, consumer information, budget information, bidding information, ad campaign information, and/or other related advertising or third party provider information.

Publishers 104 may include one or more computing devices associated with any business entities having inventories of available online advertising space. For example, publishers 104 may include online content providers, search engines, e-mail services, content websites, news websites, or any other websites attracting the online traffic of users using browsers 110. Publishers 104 may interact with advertisers 102, ad servers 106, and/or ad networks/exchanges 108 over network 112 to communicate site information, demographic information, browser cookie information, user information, ad cost information, ad inventory information, or any other information in connection with requesting ads for available advertising space on their websites. In previous techniques, after browsers 110 access webpages associated with publishers 104, the webpages may cause browsers 110 to generate and send to ad servers 106 over network 112 ad requests requesting ads to fill the available webpage ad space. The ad requests may contain, for example, cookie information (e.g., a unique identifier), user information, and/or any other information that may be used to fulfill an ad request.

Ad servers 106 may include one or more computing devices associated with any business entities that store and/or process advertising information (e.g., ad campaign information) received from advertisers 102 and/or ad inventory information received from publishers 104, either directly or indirectly. For example, in certain embodiments, ad servers 106 may directly or indirectly serve ads in response to ad requests from publishers 104, based on the advertising information received from advertisers 102 and on ad request information received from publishers 104. Ad servers 106 may also be configured to serve ads based on contextual targeting of websites, search results, and/or user profile information. For example, in response to receiving an ad request from a publisher 104, ad servers 106 may facilitate bids on the available advertising space at an ad network or ad exchange 108.

Data exchanges 107 may represent, or facilitate, entities that collect information about an online audience, such as users of browsers 110, and provide the collected information to ad servers 106, advertisers 102, ad networks/exchanges 108, and/or other entities for use in online advertising. Thus, the data exchange 107 may, among other things, perform functions of an audience intelligence provider. For example, data exchanges 107 may include server computing systems associated with websites of publishers 104, ad servers 106, content providers, financial institutions, or other entities that track online users and browsers 110 using browser cookies or other techniques. In some embodiments, data exchanges 107 may include offline entities that capture information about ad targets, such as users associated with user devices 110, in the real world via paper transactions, such as financial transactions, media subscriptions, surveys, applications, etc. In some cases, data exchanges 107 may collect, index, and segment demographic and other information about users to build user profiles. The user profiles may then be provided to ad servers 106, advertisers 102, and/or ad exchanges to target users with online advertisements tailored to their interests.

The exemplary online advertising environment 100 of FIG. 1 may include one or more ad network/exchange systems 108, which may be included in or otherwise associated with ad servers 106. Such ad network/exchanges 108 may assist ad servers 106 in selecting, based on one or more criteria, a winning bid and serving the winning ad to the web page of a publisher.

In one technique, when a user initiates a request for a webpage with a browser 110, a Hypertext Transfer Protocol (HTTP) request is sent to a publisher web server 104. The publisher 104 may return a base webpage containing publisher content (e.g., article text and images), but may contain blank spaces and/or tags to be asynchronously filled with ads. The tags embedded in the webpage may then initiate calls to one or more advertisers 102, ad servers 106, and/or and ad network/exchanges 108 to obtain advertisements. For example, the browser 110 may initiate a call to an ad exchange 108, which conducts an auction by taking bids from advertisers 102, ad servers 106, and/or other ad networks 108, determines an auction winner, obtains a specific advertisement, and returns it to the browser 110 for display.

As prompted by source code in the webpage, a browser 110 may contact and provide user and browser data to third party advertisers, trackers, analytics providers, market research providers, "data brokers," and other "third party providers." Each third party provider may further contact other third party providers. As a result, it is not uncommon for a browser loading a single webpage to contact more than a dozen third parties. These third party providers may collect data from the user, such as webpage visited, webpage subject matter, user Internet Protocol (IP) address, device identifier, web cookie data, etc. The third party providers may also exchange user profiles with each other, which may even allow user profiles to be linked to actual names, e-mails, phone numbers and addresses.

As discussed above, a user may find the data collection techniques of third party providers such as online advertisers to be intrusive, and may attempt to delete existing cookies within their browser. A cookie often contains a cookie identifier that is associated with a user profile maintained by a third party provider. While deleting a cookie would not delete the profile itself, a user might expect that deleting cookies would at least "orphan" the profile, preventing it from ever being updated again. This is not necessarily the case. Online advertisers and other third party providers may, in some cases, either intentionally or unintentionally, "de-orphan" a profile by cross-referencing it using other known identifiers, or "linked data." For example, a user may commonly visit site.com using the Internet Protocol (IP) address "1.1.1.1," and the cookie identifier "12345." The user may then delete the site.com cookie. The next time the user visits site.com, a new cookie would be created, for example, with the identifier "67890." The profile for "67890" would initially be empty, but the third party provider may notice that the IP address is still "1.1.1.1." The third party provider may thus be able to infer that cookie "67890" is the same user as cookie "12345," and may thus cross-reference and merge the profiles. The third party provider may bolster this inference with other forms of linked data. For example, the media access control (MAC) addresses, a unique device identifier, device phone number, etc., may be the same under multiple cookie identifiers. Distributed processing and other big data techniques have made cross-referencing profiles using linked data powerful, yet relatively fast and inexpensive.

Another difficulty when attempting to delete linked data is that data often exists across multiple devices. For example, a third party provider may have a user profile linking the same user to both a laptop and a smartphone. The user may clear his or her cookies on the laptop in an attempt to orphan the user profile. However, since the cookies on the smartphone still exist, they may be re-associated with the laptop, and thus to the deleted cookies. These techniques are sometimes called "device fingerprinting." As a result, the user may be given a false sense of privacy protection by deleting only one form of linked data, such as one or more cookie identifiers.

One solution is to use a proxy server. A proxy server can be set up to contact third party providers instead of the user browser directly. The proxy may prevent third party providers from obtaining the IP address of the users, along with certain other linked data identifiers. However, third parties may still receive the same cookie data and other data that allows third parties to track users and cross-reference user profiles. A proxy server may also be complex to establish and administer, and thus may be beyond the technical capacity of many Internet users.

In at least one embodiment presented herein, the publisher 104 may act as a proxy between browsers 110 and third party providers in the online advertising environment 100. Each browser 110 may provide, or be provided with, a unique browser identifier, which may be the sole form of linked data forwarded to third party providers by each publisher 104.

In one embodiment, the browser 110 may prevent itself from communicating directly with third party providers, instead directing all communications to the relevant publisher 104. In another embodiment, the publisher 104 may remove and/or replace code in webpages provided to the browser 110 such that browser communications that would otherwise be directed to third party providers will instead be directed to the publisher 104. In particular, this code replacement may involve modifying uniform resource locators (URLs) which had been directed to third party providers.

The unique browser identifier may be stored on the device executing the browser 110, and may be provided to one or more publishers 104 in, for example, an HTTP header. The unique browser identifier may also be assigned and/or stored at the publisher 104. In this configuration, the browser may behave normally and be otherwise capable of directly communicating with third parties, although the publisher 104 may prevent this from occurring.

Cookies and other data intended for third party providers may be forwarded from the browser 110 to the publisher 104, as discussed above. The publisher 104 may remove any linkable or cross-referenceable data or identifiers from the communication, and may further replace any linked data with the unique browser identifier. The modified cookie and/or data may then be forwarded to third party providers.

In previous techniques, webpages provided by publishers 104 may contain code that would cause browsers 110 to contact third party providers, as discussed above. For example, site.com would insert a line of code into an empty space on a webpage reserved for an advertisement. The code may cause the browser 110 to contact a third party ad exchange 108. The ad exchange 108 may then request a variety of data about the advertisement, the browser 110, the webpage, and the user of the browser to conduct an auction for the advertisement space. For example, using a cookie identifier, IP address, and other data provided by the browser, the ad exchange may determine the approximate geographic location of the browser, the age, gender, and interests of the user, the subject of the webpage, the size of the available advertisement, etc. The ad exchange 108 may present this information to advertisers 102 and accept bids for the space. Upon determining a winner of the auction, the ad exchange 108 may then provide the advertisement, for example from an ad server 106, to the browser 110 for display.

According to embodiments presented herein, one or more software modules may be installed on one or more publisher servers 104 to interact with third party providers. Thus, for example, instead of a browser 110 communicating with an ad exchange 108, software modules on the publisher 104 may receive, filter, replace, and/or relay information to the ad exchange 108. Any previous technique that required a browser 110 to communicate with a third party provider may have a corresponding software module installed on the publisher 104 that performs a similar technique. Software modules may include a data exchange module, an analytics module, a content delivery network (CDN) module, etc., as will be discussed further below.

In at least one embodiment, the unique browser identifier may be reset and/or changed by a user. Alternatively, the user may designate that the browser will reset the unique browser identifier at a predetermined time interval, or, for example, upon an event, such as each time the browser 110 visits the publisher 104 website. If the unique browser identifier is maintained at the publisher 104, it may be reset and/or updated by action of a user, a browser 110, and/or by the publisher 104. As discussed above, the unique browser identifier may be the only linked data provided to third parties. As a result, upon a unique browser identifier reset, associated user and browser profiles may be reliably and permanently orphaned.

Unique browser identifier resets may also propagate to more than one device. For example, if a user has a laptop and a cellphone with separate browsers 110 linked by a common user account, resetting the unique browser identifier on one browser may automatically trigger a reset on the other This may reduce the ability of third party providers to cross-reference commonly-owned devices.

Figure 2:
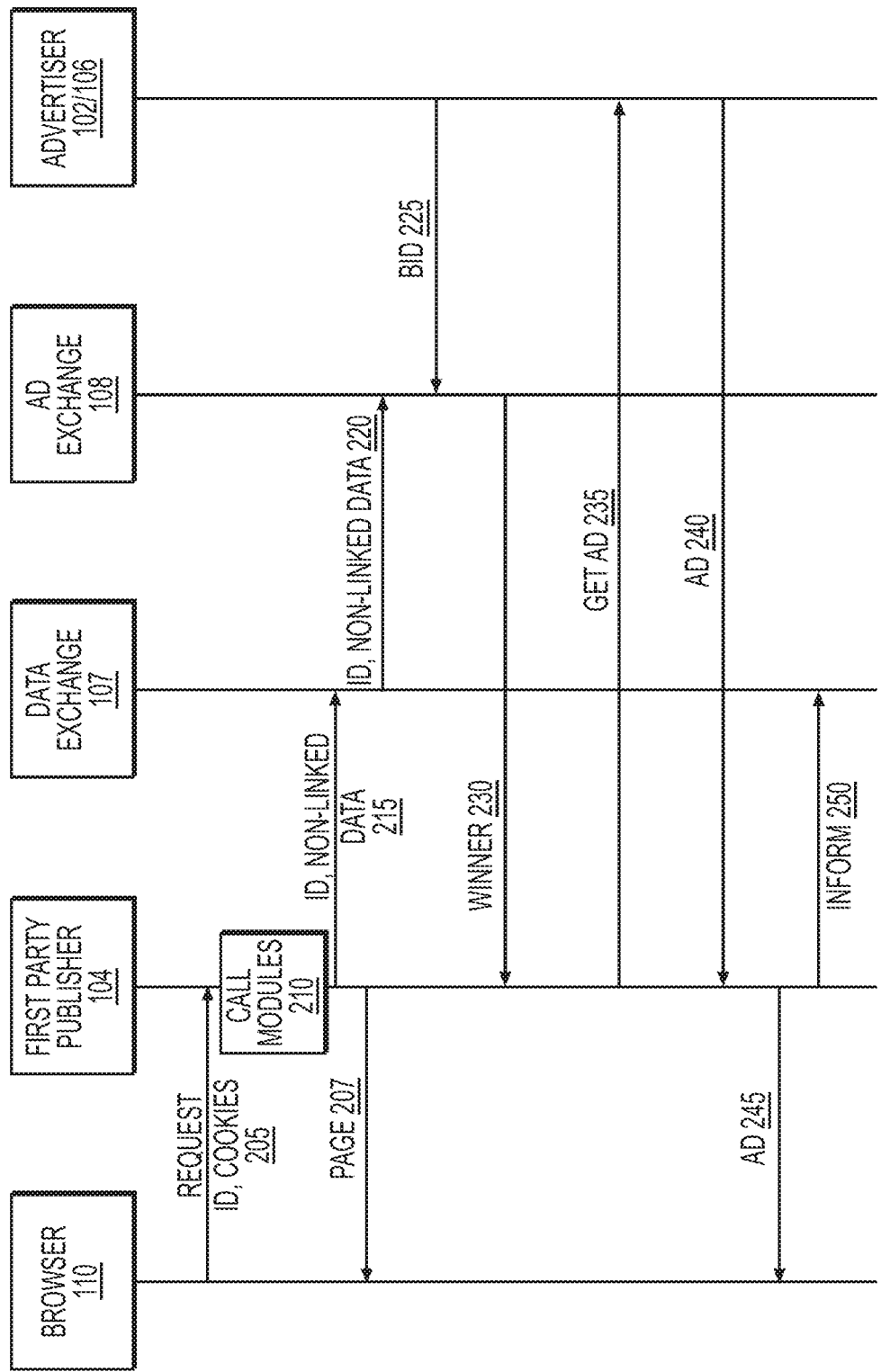
FIG. 2 is an exemplary ladder diagram of a privacy-friendly advertising system, consistent with one or more disclosed embodiments.

FIG. 2 is a ladder diagram depicting an embodiment of the present disclosure. At step 205, a user may initiate a browser 110 request for a webpage from a publisher 104. The request may include a unique browser identifier, which may be embedded in an HTTP header, and data such as cookies, a device identifier such as a MAC address, and/or any number of linked identifiers.

The publisher may return at least a portion of the requested webpage at step 207, such as, for example, a portion that is locally available publisher content. For example, if the requested webpage contains an article, the text of the article may be provided to the browser 110. One of more areas of the webpage may be left blank to be filled by advertisements and other third party content, asynchronously. Alternatively, the publisher 104 may wait to receive all third party content, and return a completed webpage to the browser 110.

The publisher 104 may provide at least a portion of the request to any number of software modules 210 such as an analytics module, a CDN module, and a data exchange module. For example, at step 215, the data exchange module may initiate a call to a data exchange 107, providing the unique browser identifier and any amount of non-linked data. Non-linked data may include data that is not cross-referenceable with other user profiles, and/or data that is not linkable to a specific user. Software modules 210 may perform any number of processing steps to filter, modify, and/or remove linked data from messages to third parties. For example, third party providers, such as an ad exchange 108 may have, in previous techniques, used an IP address of the browser 110 to determine a rough geographic location of a user. Software modules 210 may instead provide one or more zip codes, latitude and longitude coordinates, and/or other geographic identifiers in lieu of the IP address to third party providers. The specific types of data provided by the publisher 104 to third party providers may be user-configurable, and may require user approval.

Alternatively, one or more third party providers may be considered "trusted" and may receive more than one linked identifier. For example, the data exchange 107 may be provided a browser IP address in furtherance of fraud prevention and ad verification, as will be discussed below.

The data exchange 107 may perform, or cause to be performed, any number of services on behalf of publishers 104 or third party providers, such as advertisers 102. The data exchange 107 may perform services from any number of network servers that may be affiliated or unaffiliated with each other. The data exchange 107 may contain one or more software modules performing, or which cause to be performed, market research, audience measurement, fraud prevention, and ad verification, as will be discussed further below. The data exchange may execute these modules asynchronously.

At step 220, the publisher 104 or the data exchange 107 may provide the unique browser identifier and any number of non-linked data items to an ad exchange or an ad network 108. If the unique browser identifier has been used in previous auctions, the advertisers 102 participating in the auction and/or the ad exchange 108 itself may have associated user profiles, which may be updated with the non-linked data items.

At step 225, one or more advertisers 102, or representatives thereof, may bid on impressions, or may sell user profiles to other third parties. At step 230, a winner of the auction may be selected, and the publisher 104 may be informed. In response, at step 235 the publisher 104 may request a particular ad from the winning advertiser 102, which may be provided by the advertiser 102, or by an ad server 106. The specific ad may be provided to the publisher 104 at step 240. Alternatively, ad network or ad exchange 108 may provide the specific advertisement at step 240 to the publisher 104. At step 245, the publisher 104 may provide the advertisement to the browser 110 for display. The publisher 104 may also inform the data exchange 107 of the results of the attempt to display the ad on the browser 110. The publisher may also provide additional feedback to the publisher 104, such as whether the advertisement was clicked, etc. Additional feedback may be provided by the publisher 104 to the data exchange 107 for advertisement verification, fraud prevention, etc.

The specific ordering of the steps discussed above may vary. For example, a specific ad may be provided by an advertiser 102 or ad server 106 without an auction. The publisher 104 may not utilize a data exchange 107 or, alternatively, the functions of the data exchange 107 may be performed by the publisher 104.

Figure 3:
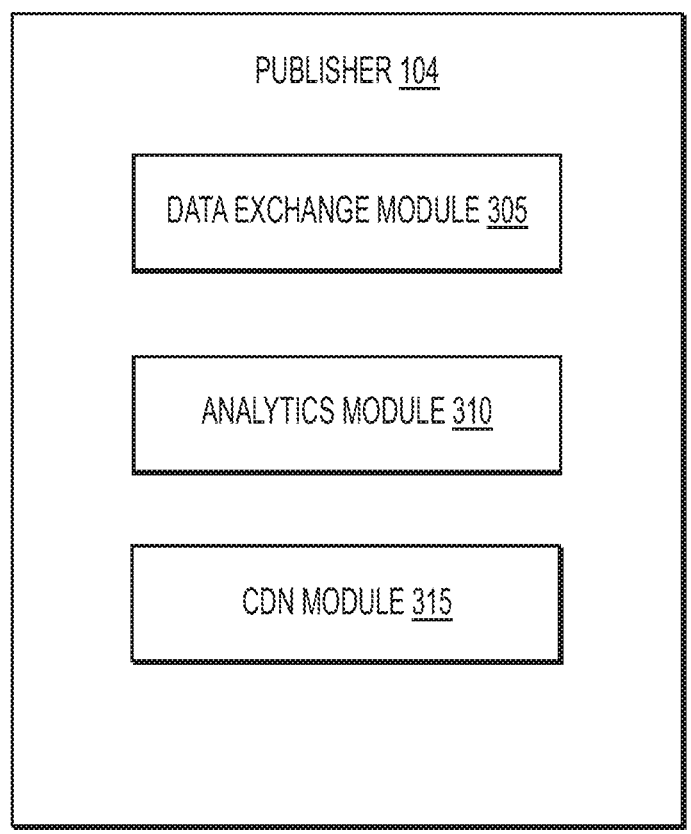
FIG. 3 is a block diagram of an example first party publisher, consistent with disclosed embodiments.

FIG. 3 is a block diagram depicting example software modules executed by one or more publishers 104. The publisher 104 may use the modules to maintain analytics data, tracking data, etc. Alternatively, the modules may simply execute calls embedded in the publisher webpage to third party providers using, for example, software application programming interfaces (APIs). This may allow the publisher to focus on providing content or services, while forwarding non-linked data to third party providers.

In general, features related to advertising that in previous techniques were performed by the user browser, may now be performed via the publisher 104. The data exchange module 305 may primarily exchange data with the data exchange 107, the features of which will be discussed further below. Alternatively, the data exchange module 305 may perform the functions of the data exchange 107 on the publisher 104.

Web analytics tools measure, collect, and analyze web data in order to provide a better understanding of web usage. For example, a website administrator may be able to see the number of user visits and hits to each webpage in the website. In previous techniques, analytics solutions would generally monitor third party activity, such as third party advertiser activity, via the browser 110. In embodiments presented herein, the analytics module 310 may monitor third party provider activity passing through the publisher 104, which simplifies data gathering.

The publisher 104 may also execute a CDN module 315. A CDN may increase the availability and performance of network content by duplicating it on multiple servers. As a result, a publisher may be able to access third party content more quickly by selecting the server to provide the content that is closer and/or less congested. The use of a CDN may become more necessary when the publisher behaves as a proxy because bandwidth demands may increase substantially.

Figure 4:
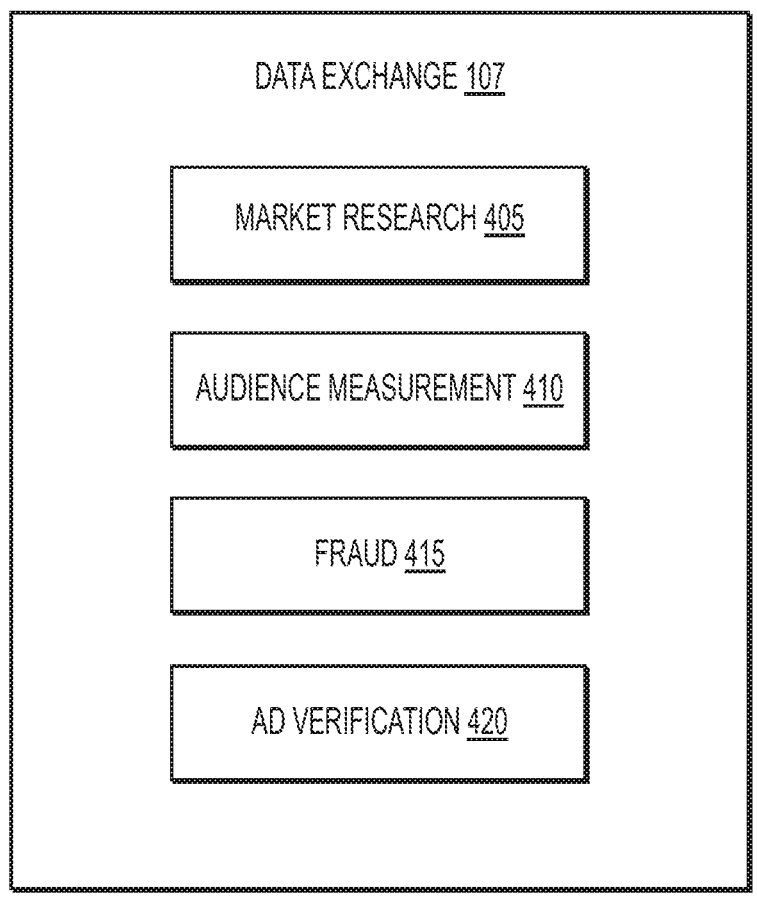
FIG. 4 is a block diagram of an example data exchange, consistent with disclosed embodiments.

FIG. 4 is a block diagram depicting the example functions of a data exchange 107, which is optional and may be installed on the publisher 104, or independently as shown in FIG. 1.

The data exchange 107 may first perform data management. The data exchange 107 may maintain user profiles with demographic, location, gender, age, and other non-linked data for forwarding to third party providers. As described above, data exchange 107 may be implemented in any combination of network-connected servers.

The data exchange 107 may also include a market research module 405 to perform or facilitate market research. For example, targeted questionnaires may be provided to users to obtain profile information and feedback. The questionnaires may be presented to a sampling of users, or more broadly. The data exchange 107 may or may not be permitted to pass this data along to an ad exchange 108, and may require user permission to do so.

The data exchange 107 may also include an audience measurement module 410 to perform or facilitate an audience measurement function. Information about the demographics and other personal traits of users of publishers 104 may be determined. Publishers may be compared with each other to determine, for example, what are the most popular sites for women. Audience measurement information may or may not be passed to an ad exchange 108, and again may require user permission to do so.

The data exchange may also include a fraud module 415 to perform or facilitate fraud prevention strategies. Records may be stored of each advertisement successfully served to a browser, or of advertisements that are about to be served to a browser. This may help determine if the advertisements are being served to, for example, click farms or other fraudulent entities. The same data collected for fraud determination purposes may also be collected by an ad verification module 420 for advertisement verification, which may be provided to advertisers 102, ad servers 106, and other advertising entities. The publisher 104 may also provide other entities in the online advertising environment 100 with IP addresses and other linked data, as necessary, to perform ad verification and fraud prevention. These entities may be prohibited from providing the linked data, other than the unique browser identifier, to third parties. The publisher 104 may provide regular updates about advertisements served to the data exchange 107, and/or to other entities in the online advertising environment 100.

The data exchange 107 may perform the functions of modules 405-420 on a data exchange server, or by communicating with third parties, for example, via network API.

The embodiments described herein have a number of advantages over existing techniques. First, user privacy is substantially improved, since it becomes more difficult for third party providers to obtain and cross-reference user profiles without a number of linked identifiers. Data collection is abstracted from the ad networks/exchanges 108 in order to protect user privacy. Second, webpages may load substantially faster, as they may be free of the potentially large number of tags that did nothing but call and load third party content. In embodiments described herein, the publisher 104 may load advertisements asynchronously, thus allowing for a fast initial load. These benefits are provided while still retaining analytics and rich advertising content determination, such as advertising, based upon geographic location, demographic data, user interests, etc.

Further, the number of third party providers that may be present on a page becomes scalable, particularly if the publisher utilizes parallel processing. For example, it now becomes possible for a webpage to embed content from hundreds or even thousands of third party providers. This would not be possible with existing techniques, especially for bandwidth-limited devices such as mobile phones. Since the publisher 104 may be contacting each third party provider instead of the browser 110, the amount of data used by the browser 110 may also be substantially reduced.

Figure 5:
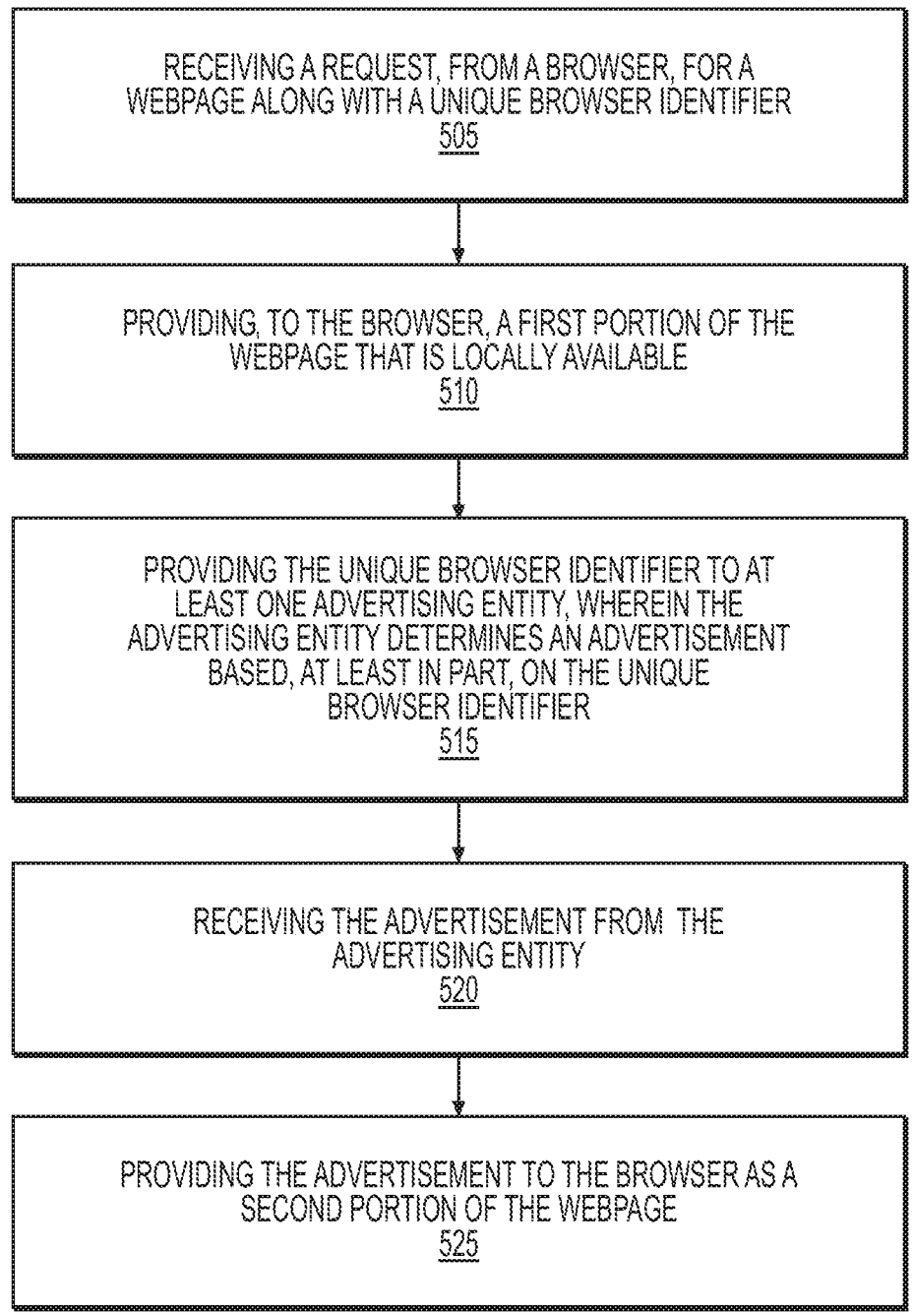
FIG. 5 is a flow diagram of an exemplary method for providing privacy-friendly advertising, according to an embodiment of the present disclosure.

FIG. 5 provides an example flowchart of an embodiment described herein. At step 505, a request may be received from a browser for a webpage along with a unique browser identifier. At step 510, a first portion of the webpage that is locally available may be provided to the browser. At step 515, the unique browser identifier may be provided to at least one advertising entity, wherein the advertising entity determines an advertisement based, at least in part, on the unique browser identifier. At step 520, the advertisement may be received from the advertising entity. At step 525, the advertisement may be provided to the browser as a second portion of the webpage.

Figure 6:
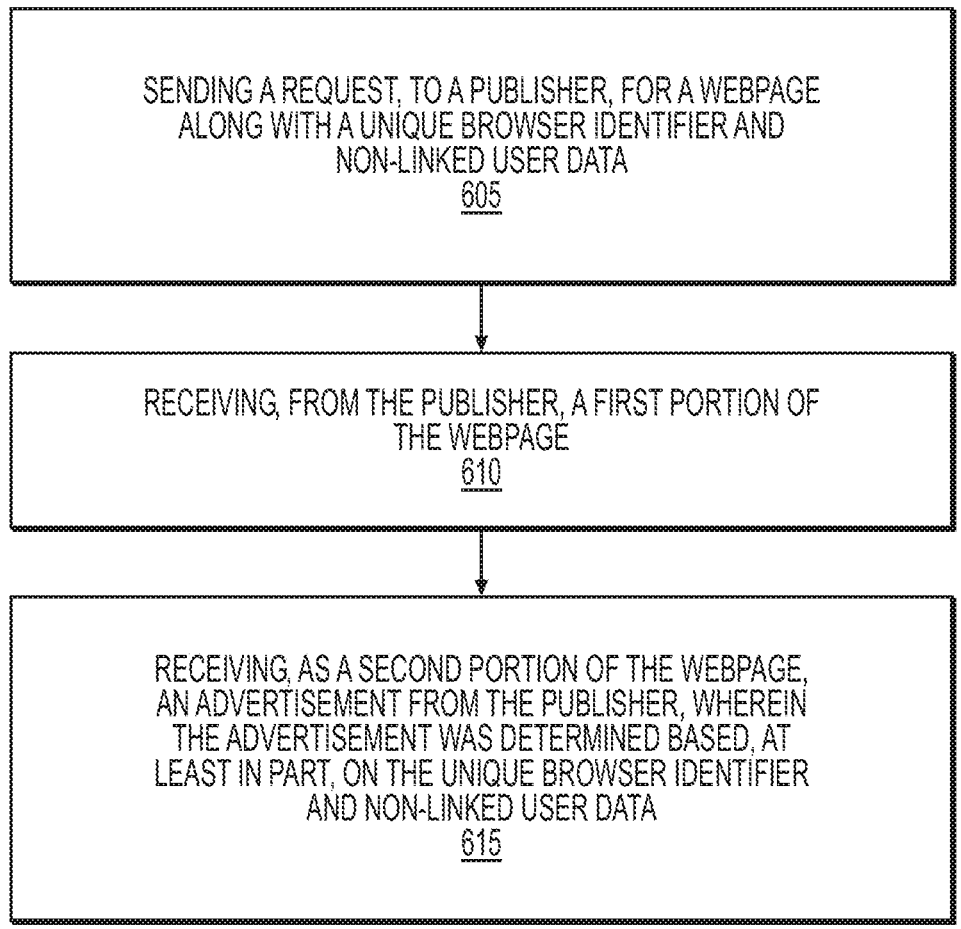
FIG. 6 is a flow diagram of an exemplary method for providing privacy-friendly advertising, according to an embodiment of the present disclosure.

FIG. 6 provides a flowchart of another exemplary embodiment described herein. At step 605, a request may be sent to a publisher for a webpage along with a unique browser identifier and non-linked user data. At step 610, a first portion of the webpage may be received from the publisher. At step 615, an advertisement may be received as a second portion of the webpage, wherein the advertisement was determined based, at least in part, on the unique browser identifier and non-linked user data.

Figure 7:
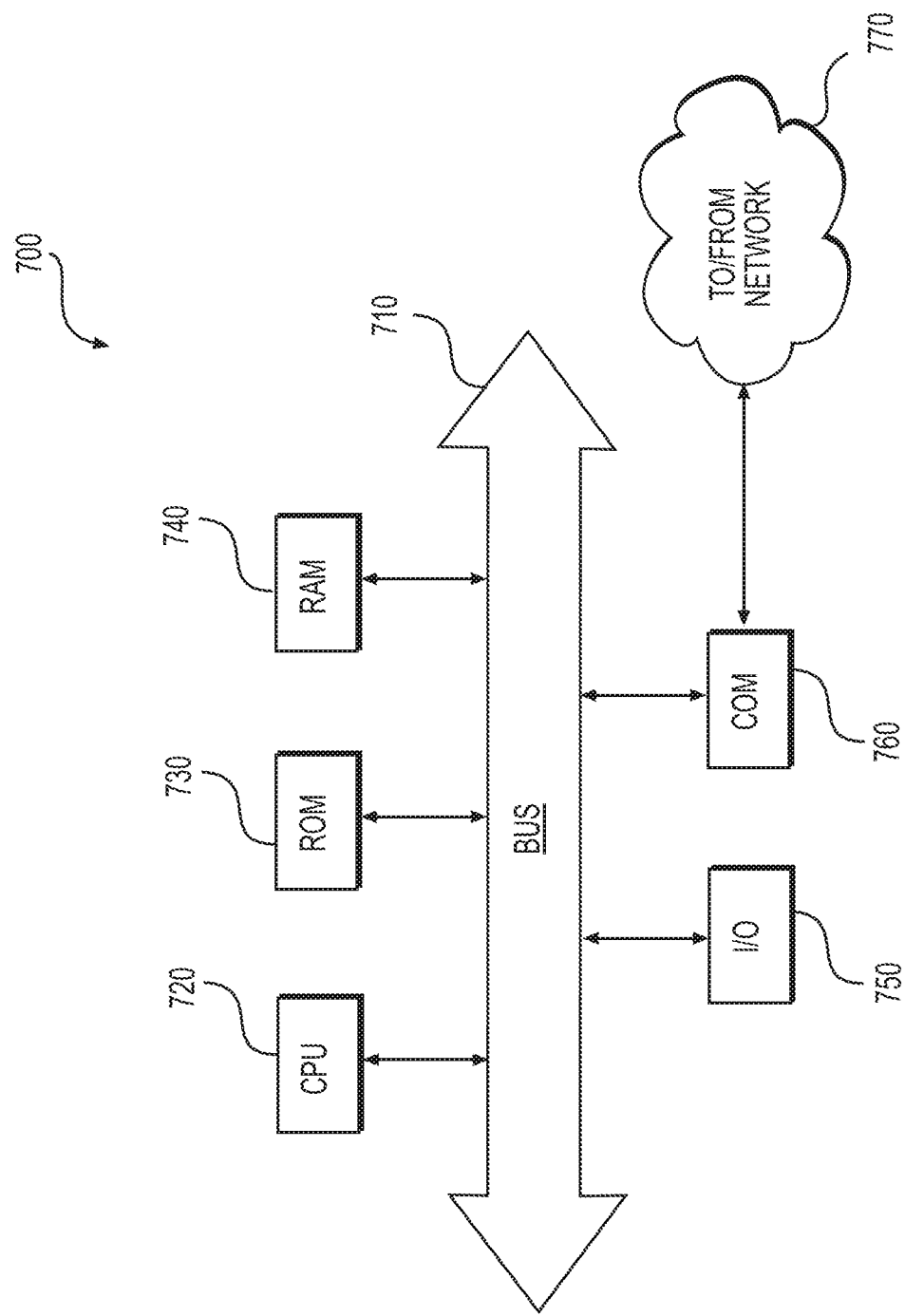
FIG. 7 is a simplified functional block diagram of a computer and/or server that may be configured as a device or system performing privacy friendly online advertising, according to an exemplary embodiment of the present disclosure.

FIG. 7 provides a functional block diagram illustration of general purpose computer hardware platforms. FIG. 7 illustrates a network or host computer platform 700, as may typically be used to implement a server, such as a publisher 104, or a browser 110, or any other device executing features of a privacy-friendly advertising network. It is believed that those skilled in the art are familiar with the structure, programming, and general operation of such computer equipment and as a result, the drawings should be self-explanatory.

A platform for a server or the like 700, for example, may include a data communication interface for packet data communication 760. The platform may also include a central processing unit (CPU) 720, in the form of one or more processors, for executing program instructions. The platform typically includes an internal communication bus 710, program storage, and data storage for various data files to be processed and/or communicated by the platform such as ROM 730 and RAM 740, although the server 700 often receives programming and data via network communications 770. The hardware elements, operating systems, and programming languages of such equipment are conventional in nature, and it is presumed that those skilled in the art are adequately familiar therewith. The server 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure that fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for protecting consumer privacy, during a browsing session, in an online data element distribution environment, the method comprising:
    receiving, at a publisher device, a request from a browser for a webpage, along with a unique browser identifier;
    replacing, by the publisher device, code of the webpage such that the code that would normally instruct the browser to communicate with one or more third party providers will instead direct communication to the publisher;
    providing, from the publisher device to the browser, a first portion of the webpage that is locally available;
    providing, from the publisher device to at least one data element distribution entity, the unique browser identifier, wherein the at least one data element distribution entity determines a data element based, at least in part, on the unique browser identifier;
    receiving, at the publisher device from the at least one data element distribution entity, the determined data element from the at least one data element distribution entity;
    providing, from the publisher device to the browser, the received data element as a second portion of the webpage; and
    resetting, by the publisher device, the unique browser identifier at a predetermined time interval.

2. The computer-implemented method of claim 1, further comprising:
    providing non-linked data to the at least one data element distribution entity, wherein the at least one data element distribution entity further determines the data element based, at least in part, on the non-linked data.

3. The computer-implemented method of claim 2, wherein the non-linked data comprises data that is not linkable to a specific browser or a specific user.

4. The computer-implemented method of claim 1, wherein providing the unique browser identifier to the at least one data element distribution entity further comprises providing the unique browser identifier to a data exchange,
wherein the data exchange provides non-linked data and data associated with the unique browser identifier to the at least one data element distribution entity, and
wherein the at least one data element distribution entity further determines the data element based, at least in part, on the data associated with the unique browser identifier.

5. The computer-implemented method of claim 1, wherein the unique browser identifier is a first unique browser identifier, and wherein the method further comprises:
receiving a second request for a webpage along with a second unique browser identifier from the browser; and
providing the second unique browser identifier to the at least one data element distribution entity, wherein the first unique browser identifier is not cross-referenceable with the second unique browser identifier.

6. The computer-implemented method of claim 1, wherein providing the unique browser identifier to the at least one data element distribution entity further comprises removing data from the request which can be linked to a specific browser or a specific user, with exception of the unique browser identifier, and providing the request to the at least one data element distribution entity.

7. A non-transitory machine-readable medium storing instructions that, when executed by a computing system, causes the computing system to perform a method for protecting consumer privacy, during a browsing session, in an online data element distribution environment, the method comprising:
receiving, at a publisher device, a request from a browser for a webpage, along with a unique browser identifier;
replacing, by the publisher device, code of the webpage such that the code that would normally instruct the browser to communicate with one or more third party providers will instead direct communication to the publisher;
providing, from the publisher device to the browser, a first portion of the webpage that is locally available;
providing, from the publisher device to at least one data element distribution entity, the unique browser identifier, wherein the at least one data element distribution entity determines a data element based, at least in part, on the unique browser identifier;
receiving, at the publisher device from the at least one data element distribution entity, the determined data element from the at least one data element distribution entity;
providing, from the publisher device to the browser, the received data element as a second portion of the webpage; and
resetting, by the publisher device, the unique browser identifier at a predetermined time interval.

8. The non-transitory machine-readable medium of claim 7, wherein the request includes non-linked data comprising data that is not linkable to a specific user or a specific browser.

9. The non-transitory machine-readable medium of claim 7, further comprising:
in response receiving a modify request, causing the unique browser identifier to be modified.

10. The non-transitory machine-readable medium of claim 9, further comprising:
in response to receiving the modify request, causing at least one additional unique browser identifier in at least one additional browser to be modified.

11. The non-transitory machine-readable medium of claim 9, further comprising:
in response to receiving the modify request, causing the unique browser identifier in at least one additional browser on at least one additional device to be modified.

12. A system for protecting consumer privacy, during a browsing session, in an online data element distribution environment, the system including:
a data storage device storing instructions for protecting consumer privacy in the online data element distribution environment; and
a processor executing the instructions to perform a method including:
receiving, at a publisher device, a request from a browser for a webpage along with a unique browser identifier;
replacing, by the publisher device, code of the webpage such that the code that would normally instruct the browser to communicate with one or more third party providers will instead direct communication to the publisher;
providing, from the publisher device to the browser, a first portion of the webpage that is locally available;
providing, from the publisher device to at least one data element distribution entity, the unique browser identifier, wherein the at least one data element distribution entity determines a data element based, at least in part, on the unique browser identifier;
receiving, at the publisher device from the at least one data element distribution entity, the determined data element from the at least one data element distribution entity;
providing, from the publisher device to the browser, the received data element as a second portion of the webpage; and
resetting, by the publisher device, the unique browser identifier at a predetermined time interval.

13. The system of claim 12, wherein the method further includes:
providing non-linked data to the at least one data element distribution entity, wherein the at least one data element distribution entity further determines the data element based, at least in part, on the non-linked data.

14. The system of claim 13, wherein the non-linked data comprises data that is not linkable to a specific browser or a specific user.

15. The system of claim 12, wherein providing the unique browser identifier to the at least one data element distribution entity further comprises providing the unique browser identifier to a data exchange,
wherein the data exchange provides non-linked data and data associated with the unique browser identifier to the at least one data element distribution entity, and
wherein the at least one data element distribution entity further determines the data element based, at least in part, on the data associated with the unique browser identifier.

16. The system of claim 12, wherein the unique browser identifier is a first unique browser identifier, and wherein the method further includes:
receiving a second request for a webpage along with a second unique browser identifier from the browser; and
providing the second unique browser identifier to the at least one data element distribution entity, wherein the first unique browser identifier is not cross-referenceable with the second unique browser identifier.

17. The system of claim 12, wherein providing the unique browser identifier to the at least one data element distribution entity further comprises removing data from the request which can be linked to a specific browser or a specific user, with exception of the unique browser identifier, and providing the request to the at least one data element distribution entity.

\* \* \* \* \*